J. W. ALBIN.
LOCK WASHER.
APPLICATION FILED DEC. 3, 1913.
1,103,337.
Patented July 14, 1914.
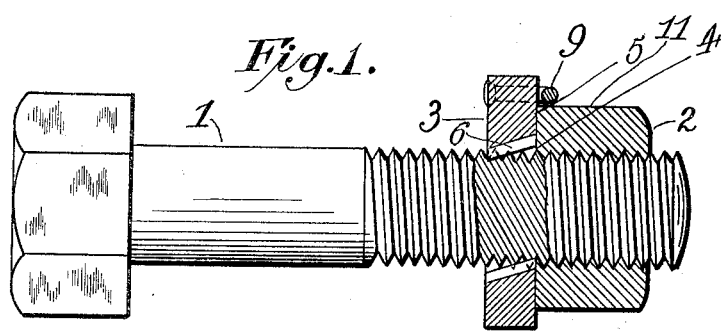
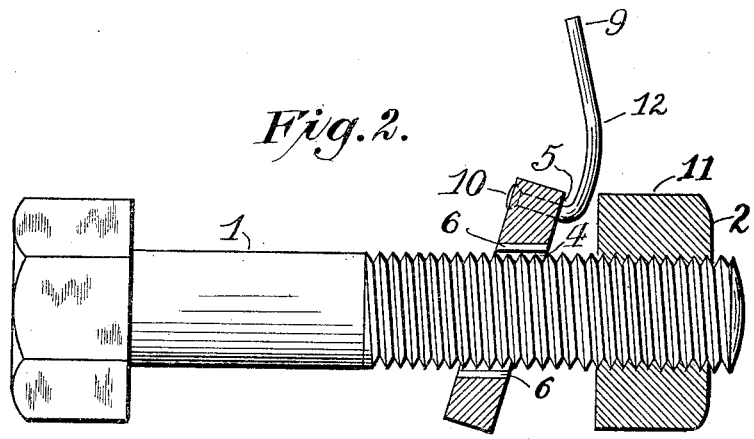
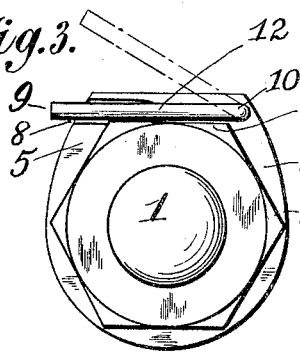 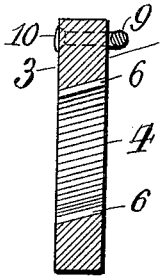 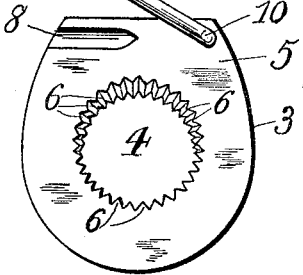
WITNESSES:
INVENTOR
Jeremiah W. Albin
BY
William E. Richards
His ATTORNEY

UNITED STATES PATENT OFFICE.

JEREMIAH W. ALBIN, OF BABYLON, NEW YORK.

LOCK-WASHER.

1,103,337.  Specification of Letters Patent.  Patented July 14, 1914.

Application filed December 3, 1913. Serial No. 804,398.

*To all whom it may concern:*

Be it known that I, JEREMIAH W. ALBIN, a citizen of the United States, and resident of Babylon, in the county of Suffolk and State of New York, have invented certain new and useful Improvements in Lock-Washers, of which the following is a specification.

This invention relates to lock washers for the nuts of bolts and like purposes, and has for its object to construct such an article in an extremely simple and inexpensive manner; to provide a complete and efficient lock that will hold the nut securely in place against accidental displacement by reason of shocks or vibrations; that will cause no injury to bolt or nut while in use, and which may be used repeatedly; and which may also be easily and quickly unlocked and removed from a bolt or other article. These and other objects of my invention are described in the following specification and shown in the annexed drawings, the particular features of novelty constituting my invention being pointed out in the claims at the end of this specification.

In the drawings, which form a part of this specification, and in which similar letters and figures of reference refer to corresponding parts wherever they occur: Figure 1 is a central longitudianl section of a bolt and nut provided with my lock washer; Fig. 2 is a side elevation partly in section showing the parts somewhat separated and the locking latch raised; Fig. 3 is an end elevation of the bolt and parts; and Figs. 4 and 5 are respectively a sectional view, and a front elevation of the lock washer.

1 indicates a bolt, and 2 a nut, both of which may be of any usual or desired form or construction.

3 is my lock washer, which consists of a plate which has an inclined central bore 4 passing through it, said bore being made slightly larger than the diameter of the bolt upon which it is used, so that said plate may be slipped on to the bolt, and fit the bolt snugly at all points around its circumference.

As shown in Fig. 2, the washer 3 when placed upon a bolt, because of its inclined bore 4, normally assumes an oblique position thereon, or in other words rests in an inclined plane with respect to the longitudinal plane of the bolt upon which it is used, so that when the nut 2 is screwed on the bolt, it will first engage the side 5 of the washer, and, as the turning of the nut is continued, the pressure of the nut on the side of the washer will cause the latter to gradually assume a position parallel to the nut, causing the walls of the bore 4 to become jammed and firmly fixed in the threads of the bolt.

The bore 4 of the washer may be provided with ribs 6, or be otherwise roughened so that it will firmly grip the bolt, but this is not absolutely necessary.

I provide one of the faces, 5, of the washer, with a transverse groove 8, and pivot one end 10 of a bent spring latch 9 to the washer in position so that it may be sprung into the groove 8, which will act as a keeper. When in this position the central part 12 of the latch 9 projects outwardly from the side of the washer and across the washer in front of the bore 4, in position to engage a side 11 of the nut 2, and prevent it from turning on the bolt.

In operation, the latch 9 is thrown out of the groove 8 while the nut 2 is being screwed against the washer, and then the latch is sprung into the keeper groove 8, the part 12 of the latch pressing firmly against the side 11 of the nut. It should be observed that the force necessary to throw the washer into a parallel position to the nut is so great that the walls of the bore of the washer are jammed into locking engagement with the threads of the bolt, while at the same time a ground joint is formed between the washer and the nut, so that all these parts are very securely locked together by this operation alone. When the spring latch, however, is brought into engagement with one side of the nut, and is then sprung into engagement with the keeper groove, the nut is positively locked in its working position, and cannot be moved on the bolt by shocks or vibrations.

I have found that the latch 9 may be conveniently made of spring wire, such as piano wire.

Having now described my invention what I claim as new and desire to secure by Letters Patent is:

1. A lock washer having an inclined bore, adapted to receive a bolt, and to be thrown into locking engagement therewith as a nut is screwed into working position against the washer.

2. A lock washer having an inclined central bore, a swinging latch secured to said washer, and means for holding said latch when it is in a closed position.

3. A lock washer having an inclined bore, a swinging latch, and a groove adapted to receive said latch, and to hold the same in a closed position.

4. A lock washer having an inclined bore, a pivoted spring latch, and a groove adapted to receive said latch and to hold the same in a closed position.

5. A lock washer comprising a flat plate having a central inclined bore, a spring latch pivotally secured to said plate at one side of said bore, and means for holding said latch in a closed position across said washer in front of said bore.

6. A lock washer having an inclined bore having depressions forming teeth around said bore, and means for locking said washer to a nut when the latter is screwed into engagement with said washer.

7. A lock washer having an inclined bore, said bore having depressions formed therein forming teeth extending longitudinally through said bore, and means for locking said washer to a nut when the latter is screwed into engagement with said washer.

Signed at New York, in the county of New York, and State of New York this 23rd day of October, A. D. 1913.

JEREMIAH W. ALBIN.

Witnesses:
GRACE M. CLARK,
WILLIAM E. RICHARDS.

---

Copies of this patent may be obtained for five cents each, by addressing the "Commissioner of Patents, Washington, D. C."